(12) United States Patent
Wogulis et al.

(10) Patent No.: US 9,203,908 B2
(45) Date of Patent: Dec. 1, 2015

(54) SYSTEM AN METHOD FOR DISAMBIGUATING COOKIES

(71) Applicant: Google Inc., Mountain View, CA (US)

(72) Inventors: James Lee Wogulis, Laguna Beach, CA (US); Bradley David Townsend, Santa Ana, CA (US); Avi Mehta, Irvine, CA (US); Xin Liu, Irvine, CA (US)

(73) Assignee: Google Inc., Mountain View, CA (US)

( * ) Notice: Subject to any disclaimer, the term of this patent is extended or adjusted under 35 U.S.C. 154(b) by 297 days.

(21) Appl. No.: 13/707,527

(22) Filed: Dec. 6, 2012

(65) Prior Publication Data

US 2013/0326040 A1 Dec. 5, 2013

Related U.S. Application Data

(60) Provisional application No. 61/654,700, filed on Jun. 1, 2012.

(51) Int. Cl.
*G06F 15/173* (2006.01)
*H04L 29/08* (2006.01)
*G06Q 30/00* (2012.01)

(52) U.S. Cl.
CPC .............. *H04L 67/16* (2013.01); *G06Q 30/00* (2013.01); *H04L 67/02* (2013.01); *H04L 67/14* (2013.01); *H04L 67/142* (2013.01)

(58) Field of Classification Search
CPC .......... H04L 67/02; H04L 67/14; H04L 67/16
See application file for complete search history.

(56) References Cited

U.S. PATENT DOCUMENTS

| 7,552,210 | B1 | 6/2009 | Blum et al. |
| 8,805,987 | B1 | 8/2014 | Kirkham et al. |
| 2009/0106349 | A1* | 4/2009 | Harris ........................... 709/203 |
| 2011/0035784 | A1* | 2/2011 | Jakobsson ........................ 726/2 |

OTHER PUBLICATIONS

Australian Examination Report on 2013203905 dated Sep. 25, 2014.
Barth U C Berkeley A: "HTTP State Management Mechanism; rfc6265.txt", HTTP State Management Mechanism; RFC6265.TXT, Internet Engineering Task Force, IEFT; Standard, Internet Society (ISOC) 4, Rue Des Falaises CH—1205 Geneva, Switzerland, Apr. 28, 2011, pp. 1-37, XP015075994.
International Preliminary Report on Patentability on PCT/US2013/034837 dated Dec. 11, 2014.
International Search Report on PCT/US2013/034837 dated Jul. 16, 2013.
Jim Wogulis et al: "Re: Using Measurement Protocol alongside analytics.js", google-analytics-analytics at Google Groups, Jan. 10, 2013, XP055069367,Retrieved from the Internet: https://groups.google.com/forum/message/raw?msg=google-analytics-analyticsjs/AUc1-LonR-6c/BcFCLBtsvkYJ.

(Continued)

*Primary Examiner* — Yves Dalencourt
(74) *Attorney, Agent, or Firm* — Foley & Lardner LLP; John D. Lanza (57) ABSTRACT

A system and method for storing a cookie of a web page are provided. An initial cookie value corresponding to a web page is received, and a domain depth of a uniform resource locator (URL) of the web page is identified. Cookie data including a name-value pair is generated for the web page. The name-value pair includes the initial cookie value and the identified domain depth. The generated cookie data is stored corresponding to a domain of the web page.

22 Claims, 7 Drawing Sheets

(56) References Cited

OTHER PUBLICATIONS

Pettersen Opera Software ASA Y: "Identifying origin server of HTTP Cookies; draft-pettersen-cookie-origin-02.txt" Identifying Origin Server of HTTP Cookies; Draft-Pettersen-Cookie-Origin-02.TXT, Internet Engineering Task Force, IETF; Standardworkingdraft, Internet Society (ISOC) 4, Rue Des Falaises CH—1205 Geneva, Switzerland, No. 2, Mar. 14, 2011. pp. 1-8, XP015074901.
Rui Guo et al: "Cross Cookie: A Cookie Protocol for Web Mashups", Electronic Commerce and Security, 2008 International Symposium on, IEEE, Piscataway, NJ, USA, Aug. 3, 2008, pp. 416-420, XP031311826, ISBN: 978-0-7695-3258-5.
Written Opinion on PCT/US2013/034837 dated Jul. 16, 2013.

* cited by examiner

SYSTEM AN METHOD FOR DISAMBIGUATING COOKIES

CROSS-REFERENCES TO RELATED APPLICATIONS

The present application claims the benefit of U.S. Provisional Patent Application No. 61/654,700, entitled "System and Method for Disambiguating Cookies," filed on Jun. 1, 2012, which is hereby incorporated by reference in its entirety for all purposes.

BACKGROUND

The present disclosure generally relates to managing cookies, and, in particular to disambiguating cookies having a same name.

Application programming interfaces (APIs) for managing browser cookies may specify name-value pairs, expiry dates, domains, and paths corresponding to cookies provided for storage. However, when a request to read a cookie is made, the API provides all cookies that are viewable to a particular page (e.g., all cookies in the same domain as the page and all cookies at higher level domains). Thus, two cookies having a same name but corresponding to different domains may be provided but may be indistinguishable from one another.

SUMMARY

The disclosed subject matter relates to a computer-implemented method for storing a cookie of a web page. An initial cookie value corresponding to a web page is received, and a domain depth of a uniform resource locator (URL) of the web page is identified. Cookie data including a name-value pair is generated for the web page. The name-value pair includes the initial cookie value and the identified domain depth. The generated cookie data is stored corresponding to a domain of the web page.

The disclosed subject matter also relates to a machine-readable medium comprising instructions stored therein, which when executed by a system, cause the system to perform operations comprising receiving cookies of a web page where each of the cookies includes a name-value pair. The value of the name-value pair includes an initial cookie value and at least one numerical value. A domain depth for each of the cookies is determined based on the at least one numerical value. A domain depth for the web page is determined. A set of cookies are identified based on the determined domain depths for each of the plurality of cookies and the determined domain depth of the web page. A set of initial cookie values corresponding to the identified set of cookies is provided.

According to various aspects of the subject technology, a system for storing a cookie corresponding to a domain of a web page is provided. The system includes one or more processors and a machine-readable medium comprising instructions stored therein, which when executed by the processors, cause the processors to perform operations comprising receiving an initial cookie value corresponding to a web page. A domain depth and a path depth of a URL of the web page are identified. Cookie data with a name-value pair including the initial cookie value, the identified domain depth, and the identified path depth is generated and stored corresponding to a domain of the web page.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

APIs that manage browser cookies may specify name-value pairs, expiry dates, domains, and paths corresponding to cookies provided for storage. When a request to read a cookie is made, however, all cookies that are viewable to a particular page are provided. These cookies include cookies in the same domain as the particular page as well as cookies at higher level domains. The name-value pair from which a cookie is identified provides no information about the domain and/or path to which the cookie corresponds. Thus, two cookies having a same name but corresponding to different domains or different paths may be indistinguishable from one another. For example, two cookies having the same name but different values representing different information stored in the cookie may be stored corresponding to the domains "foo.com" and "bar.foo.com". A page on "bar.foo.com" can read both of these cookies but has no way of distinguishing the corresponding domain to which the cookie was stored; thus, it may be ambiguous as to which value to use. This problem is further compounded by the ability to provide cookies for storage corresponding to different paths of a domain.

In order to differentiate cookies having the same name but stored corresponding to different domains, one or more values corresponding to web page characteristics (e.g., web page domains, paths, etc.) are attached to a cookie value. For example, values corresponding to a domain depth and/or a path depth may be attached to a cookie value. The domain depth corresponds to the number of components in a domain name that is delimited by a dot ('.'). For example, the web page "bar.foo.com/x/y/z" has three domain components, "bar", "foo", and "com", each of which is delimited by a dot, and thus has a domain depth of three. In some aspects, the domain name may be normalized before the depth value is computed. The domain name may be normalized by adding or dropping any leading or trailing dots. For example, ".foo-.com" may be normalized to "foo.com" when the leading dot is dropped.

Path depth corresponds to the number of components in the path, in addition to the root level path, that follows the forward slash ('/') after the domain name. Each component of the path is delimited by the forward slash. Web page "bar.foo-.com/x/y/z" also has three path components, "x", "y", and "z", in addition to the root level path of "/", for a total path depth of four. Each of the components is delimited by a forward slash. Paths may also be normalized before path depth values are computed. Paths may be normalized by adding or dropping any trailing slashes. For example, "/x/y/z/" may be normalized to "/x/y/z" when the trailing slash is dropped. Alternatively, "/x/y/z" may be normalized to "/x/y/z/" when a trailing slash is added. By providing cookie values with attached values corresponding to a domain depth and/or a path depth, cookies with the same names that were stored corresponding to different domains may be easily distinguished based on the attached values.

The disclosed subject matter relates to a computer-implemented method for storing a cookie corresponding to a domain of a web page. An initial cookie value is received and a domain depth of the web page is identified. Cookie data including a name-value pair is generated. The value of the name-value pair includes the initial cookie value and the identified domain depth. The generated cookie data is stored corresponding to a domain of a web page.

Figure 1:
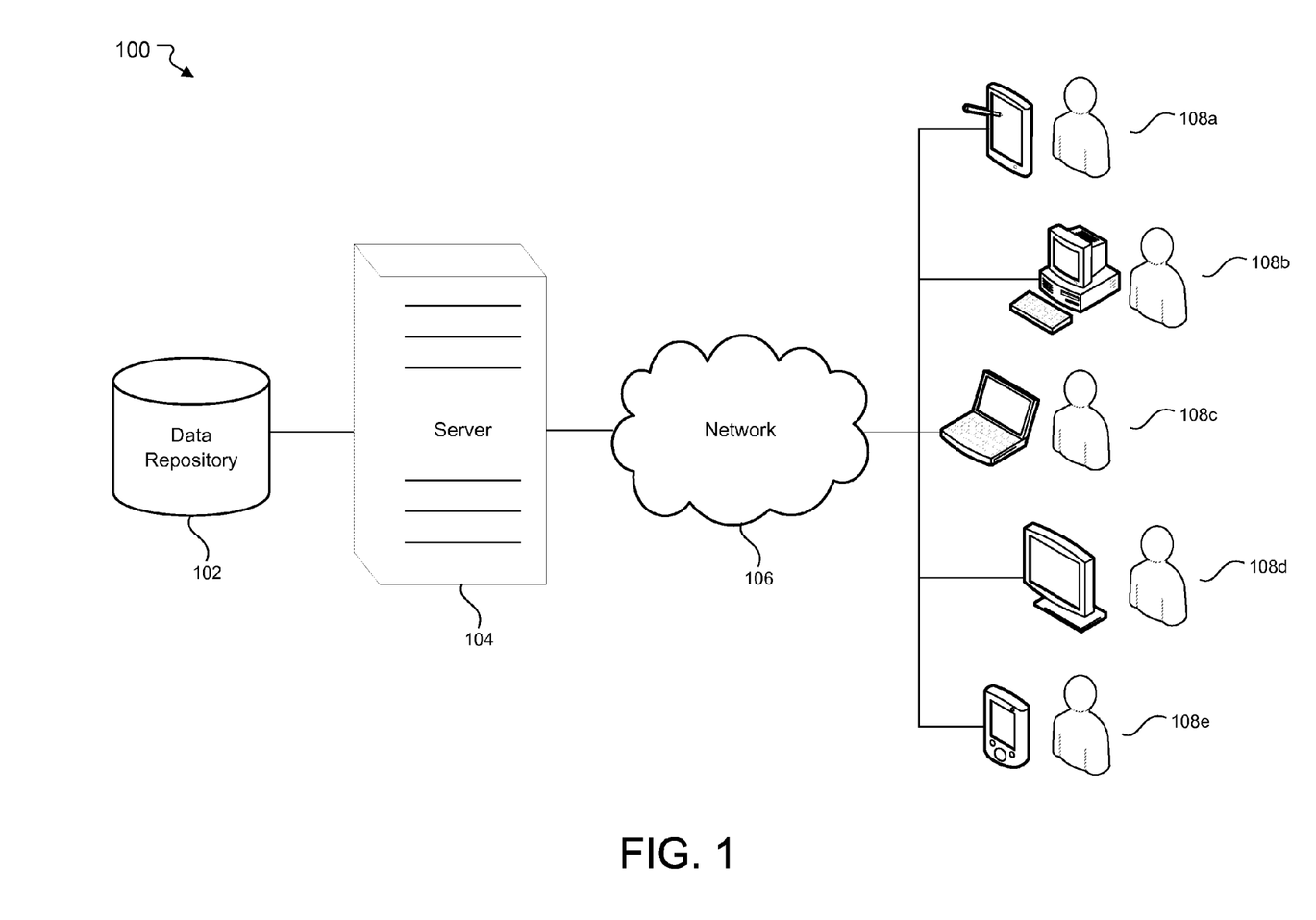
FIG. 1 illustrates an example network environment in which the subject technology may operate.

FIG. 1 illustrates an example network environment in which the subject technology may operate. Network environment 100 includes a data repository 102 (e.g., computer-readable storage media) for storing a variety of data accessed by web-based applications. While network environment 100 depicted in FIG. 1 includes a single data repository 102, additional data repositories may be included in some implementations.

The network environment 100 further includes server 104. While the network environment 100 includes a single server in FIG. 1, the network environment may include several interconnected servers in some implementations. Server 104 receives and responds to requests from user-operated client devices 108a-108e. Server 104 and client devices 108a-108e may be communicatively coupled through a network 106. In some implementations, client devices 108a-108e may request data from server 104. For example, a request to read cookies for a particular page may be made. Upon receiving the request, server 104 may retrieve all cookies that are viewable to the particular page from data repository 102 and provide the cookies to client devices 108a-108e. Client devices 108a-108e may also include local data repositories on which browser APIs may store the cookies. The cookies stored on data repository 102 or on local data repositories may include values associated with the determined domain depth and the determined path depth in the cookie value. Thus, two or more cookies having a same name but corresponding to different domains or different paths may be distinguished from one another.

Client devices 108a-108e represent various forms of processing devices. Examples of a processing device include a desktop computer, a laptop computer, a handheld computer, a television with one or more processors embedded or coupled thereto, a personal digital assistant (PDA), a cellular telephone, a network appliance, a camera, a smart phone, an enhanced general packet radio service (EGPRS) mobile phone, a media player, a navigation device, an email device, a game console, a television coupled to a processor or having a processor embedded therein, or a combination of any these data processing devices or other data processing devices.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

Figure 2:
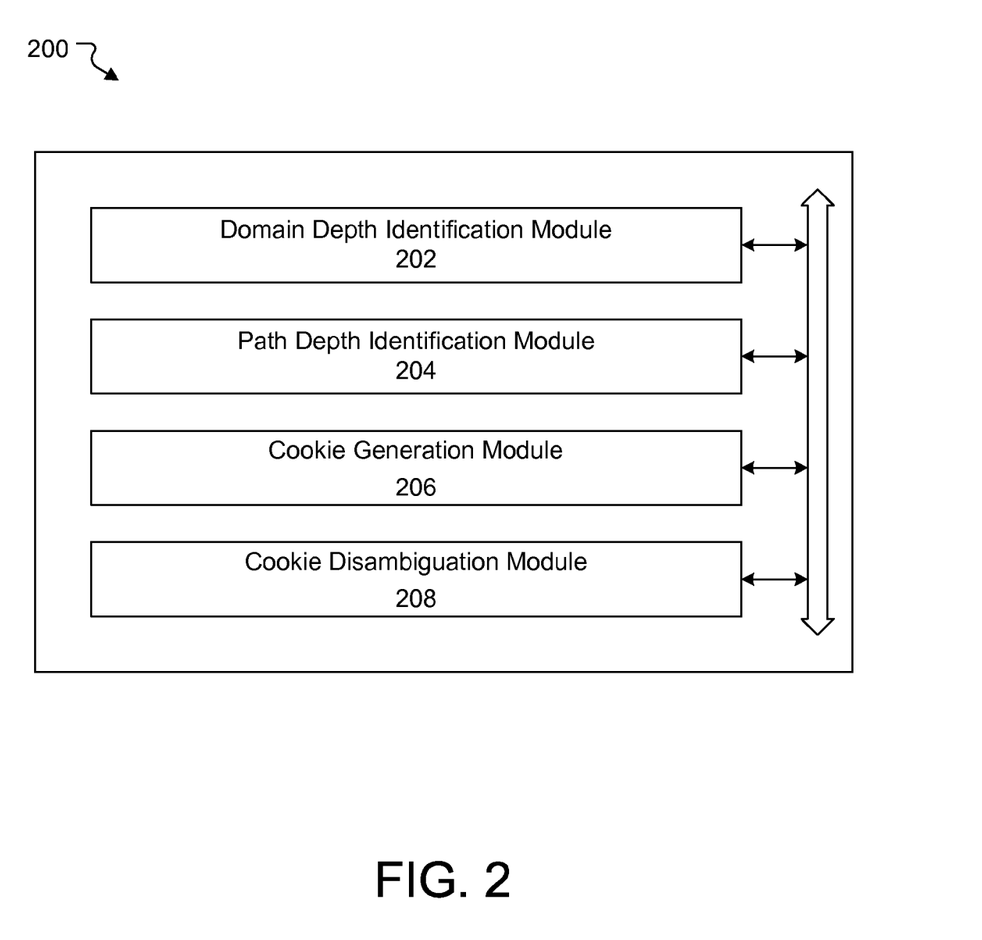
FIG. 2 illustrates an example of a server system for disambiguating cookies.

FIG. 2 illustrates an example of a system for disambiguating cookies. System 200 includes domain depth identification module 202, path depth identification module 204, cookie generation module 206, and cookie disambiguation module 208. These modules, which are in communication with one another, attach one or more values corresponding to web page characteristics to a cookie value when cookie data is generated. For example, when a cookie is to be stored, domain depth identification module 202 identifies a domain depth, and path depth identification module 204 identifies a path depth associated with the web page. Cookie generation module 206 then generates cookie data by attaching values associated with the determined domain depth and the determined path depth to the cookie value. The generated cookie data, which includes the cookie value with the attached domain depth and the path depth values, may be stored in data repository 102. Thus, when a cookie is requested by the API, the cookie is retrieved from data repository 102 and cookie disambiguation module 208 disambiguates cookies having the same name but stored corresponding to different domains and/or paths based on the attached domain depth and/or path depth values.

In some implementations, cookie generation module 206 may attach only one of the values associated with the determined domain depth or the path depth to the cookie value.

Thus, when a cookie is requested from the API and read, cookie disambiguation module 208 disambiguates cookies having the same name based on either the attached domain depth or path depth value.

As previously discussed, when a request to read cookies is made, all cookies that are viewable to a particular page are retrieved from data repository 102 and provided. Thus cookies corresponding to the same domain as well as cookies corresponding to any higher level domains may be provided. Since the name-value pair from which a cookie is identified provides no information about the domain and/or path to which the cookie corresponds, two or more cookies having a same name but corresponding to different domains or different paths may be indistinguishable from one another. However, when cookie generation module 206 generates cookie data to include the values associated with the determined domain depth and the determined path depth in the cookie value, the cookies may be disambiguated by cookie disambiguation module 208. For example, cookie disambiguation distinguishes two cookies based on the domain depth and/or the path depth values included in the cookie values.

In some implementations, the modules may reside on the client device. Thus, the cookie value may be modified without any requests or commands from a server on which the information for the web page resides. For example, the modules may be implemented in code (e.g., JavaScript) that is loaded with a web page on an application running on client devices 108a-108e. Alternatively, the modules may be implemented as code on a server. Thus, a server may generate a cookie value and request the cookie value to be stored on the client device. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
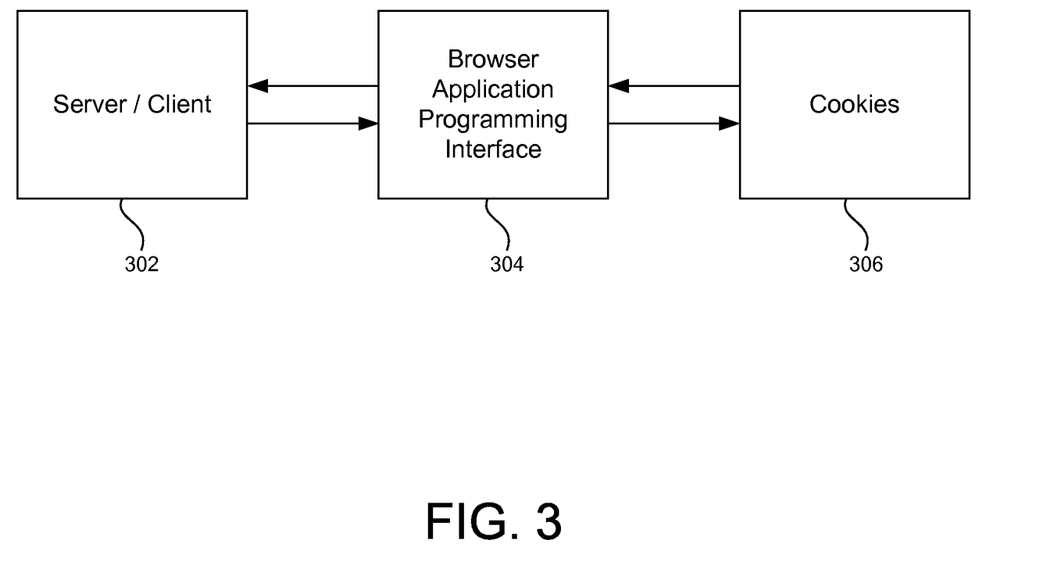
FIG. 3 illustrates an example method for disambiguating cookies.

FIG. 3 illustrates example interactions of the system for disambiguating cookies depicted in FIG. 2. The system for disambiguating cookies may reside on server/client 302. Server/client 302 is communicatively coupled to browser API 304, which manages cookie data generated by server/client 302. Browser API 304 is communicatively coupled to a designated storage on which cookies 306 are stored.

In some aspects, the system for disambiguating cookies may be implemented in script or code (e.g., JavaScript) loaded with a web page on a browser application operating on a client device. Thus, when a page request is received, the system generates cookie data that includes the values associated with the determined domain depth and the determined path depth in the cookie value. The cookie is passed to browser API 304, which subsequently stores cookies 306. When a request to read cookies for a particular web page is received, browser API 304 retrieves all cookies that are viewable to the particular web page, and provides the cookies to the client device. Since the cookies that have been stored include values associated with the determined domain depth and the determined path depth, the system may disambiguate the cookies based on the values and determine the proper cookie to be read.

In some implementations, the system for disambiguating cookies may be implemented as software processes on a server that is communicatively coupled to browser API 304. The software processes of a server may function in a similar fashion as the JavaScript on the browser application. Thus, cookie data may be generated at the server and passed onto browser API 304 to be stored on a client device. When a request to read cookies is received, the software processes on the server may similarly disambiguate the cookies based on the values and determine the proper cookie to be read.

Figure 4:
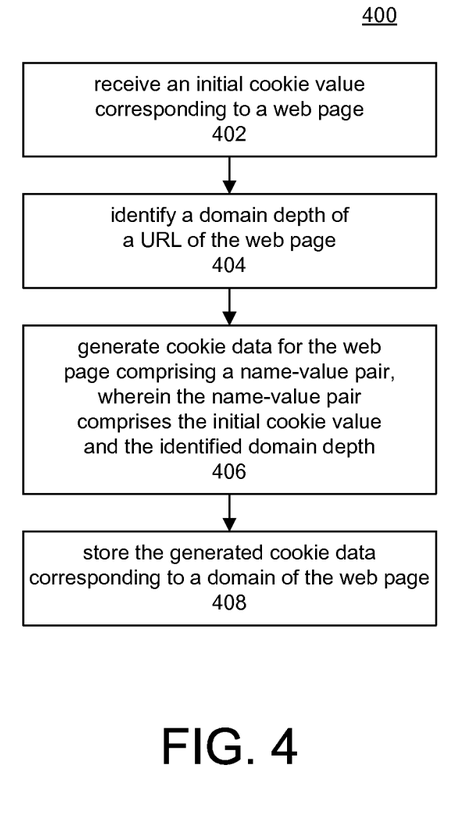
FIG. 4 illustrates an example method for generating cookies that can be disambiguated.

FIG. 4 illustrates an example method for generating cookie data that can be disambiguated. An initial cookie value is received in block 402. For example, a web browser application operating on a client device may navigate to a particular web page. A domain depth of the web page is identified in block 404. The domain depth corresponds to the number of components in a domain name that is delimited by a dot ('.'). Before computing the depth values, the domain name is normalized by adding or dropping any leading or trailing dots. For example, ".barloo.com/x/y/z/" is normalized to "barloo.com/x/y/z/" when the leading dot is dropped. The domain name, which is identified as "bar.foo.com", has three domain components, "bar", "foo", and "com", each of which is delimited by a dot. Thus, ".bar.foo.com/x/y/z/" has a domain depth of three. Cookie data including a name-value pair is generated in block 406. The value of the name-value pair includes the initial cookie value and the identified domain depth. In this example, the identified domain depth of three is included in the name-value pair. The generated cookie data is stored corresponding to a domain in block 408. The cookie may then be stored on a data repository to be retrieved when requested.

In some aspects, the identified domain depth is attached by prepending a numerical value corresponding to the domain depth to the initial cookie value (i.e., adding the numerical value in front of the cookie value). In this example, the domain associated with the cookie value is determined to have a depth of three, then a value of three is prepended to the cookie value to produce the following:

mycookie=3.cookie_value

While this example shows the domain depth value being delimited from the cookie value by a dot, other characters or symbols may be used to delimit the domain depth value and the cookie value. Furthermore, the domain depth value may be appended to the cookie value rather than prepended.

In some implementations, a path depth of the web page may also be identified and incorporated with the determined cookie value of the web page. The path depth corresponds to the number of components in the path following the forward slash ('/') after the domain name. Similar to domain names, paths are normalized by adding or dropping any trailing slashes. Using the example from above, ".bar.foo.com/x/y/z/" comprises path components "/x/y/z/", which may be normalized to "/x/y/z" when the trailing slash is dropped. Each component of the path is delimited by the forward slash. Thus, ".bar.foo.com/x/y/z/" has three path components, "x", "y", and "z". ".bar.foo.com/x/y/z/" also includes a root path of "/". Accordingly, ".bar.foo.com/x/y/z" has a total path depth of four.

Similar to the incorporation of a domain depth, the path name is also incorporated with the determined cookie value when a cookie is stored by prepending a numerical value corresponding to the path depth to the cookie value (i.e., adding the numerical value in front of the cookie value). In some aspects, both the domain depth and the path depth are incorporated. For example, the above URL, ".bar.foo.com/x/y/z/", has a domain depth of three and a path depth of four. The two values corresponding to the domain and path depths are prepended to the cookie value to produce the following cookie:

mycookie=3-4.cookie_value

While this example shows the domain depth and path depth values being separated by a dash ('-'), and the two values being delimited from the cookie value by a dot, other characters or symbols may be used to separate the path and depth values and to delimit the values and the cookie value. In some aspects, a different order in which the values are presented may also be used. For example, the path depth value may be presented first, followed by a dash and then the domain depth value. When a path depth value is zero, the path depth value may be omitted from the cookie value in some aspects. Furthermore, the path depth value may be appended to the cookie value rather than prepended. In some aspects, the domain depth value may be prepended while the path depth value may be appended and vice versa, such that the domain depth value and the path depth value are separated by the cookie value.

In some implementations, a version number is identified and incorporated with the determined cookie value of the web page. The version number may be used to identify the version of the cookie format (e.g., the order in which the values are presented) being used so that software reading the cookie may properly interpret the data. In some aspects, the version number may correspond to a version of the software library that wrote the cookie. Utilizing version number allows changes in the format to be made in the future if needed. For example, a first version may correspond to prepending a version, a domain depth, and a path depth, in order, to the cookie value. Using the above example URL, "bar.foo.com/x/y/z", a first version of the script may produce the following cookie:

mycookie=1.3-4.cookie_value

This example shows two dots that delimit the version number, domain depth and path depth values (separated by a dash), and the cookie value. However, different orders in which the version number, the domain depth value, and path depth value are presented may also be used.

In some implementations, the cookies are stored on the client device. For example, when a web browsing application operating on a client device navigates to a particular web page, a cookie corresponding to the web page may be stored by the web browsing application in a local data repository on the client device. The values prepended to the cookie value to indicate the version, the domain depth, and the path depth are used to identify the scope of the cookies when the cookies are read or when the cookies are updated. By providing an identifiable scope, different cookies corresponding to different domains and/or paths that would otherwise have a same cookie name may be differentiated. For example, without the prepended information, a first cookie for "foo.com/x/y/z" is indistinguishable from a second cookie for "bar.foo.com/x/y/z" having a same cookie name. With the additional information incorporated into the cookie value, the first cookie may be differentiated from the second cookie by the prepended information. For example, "1.3-4.cookie_value" can be clearly distinguished from "1.2-4.cookie_value", even though both cookies share the same name.

Figure 5:
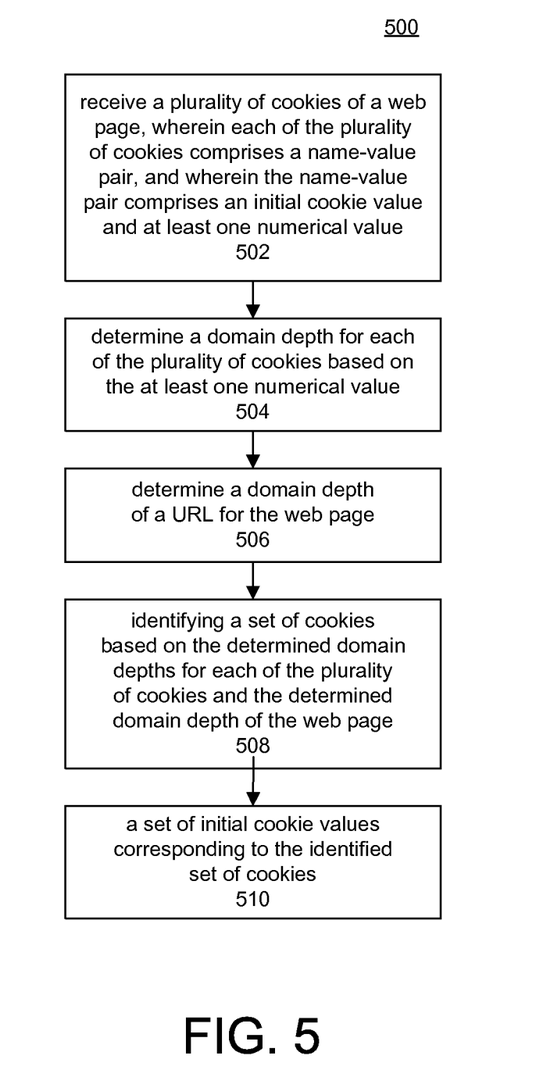
FIG. 5 illustrates an example method for reading cookies that can be disambiguated.

FIG. 5 illustrates an example method for reading cookies that can be disambiguated. Cookies of a web page are received in block 502. Each of the cookies includes a name-value pair where the value of the name-value pair includes an initial cookie value and at least one numerical value. A domain depth is determined for each of the cookies based on the at least one numerical value in block 504. For example, the received cookies may have numerical values corresponding to the cookies prepended to the cookie values. Thus, the domain depth may be determined based on the prepended numerical value. A domain depth is determined for the web page in block 506. The domain depth corresponds to the number of components in a domain name that is delimited by a dot ('.'). For example, the domain name "bar.foo.com" has three domain components, "bar", "foo", and "com", each of which is delimited by a dot, and thus has a domain depth of three.

A set of cookies are identified based on the determined domain depths for each of the cookies and the determined domain depth of the web page in block 508, and a set of initial cookie values corresponding to the identified set of cookies are provided in block 510. Returning initial cookie values corresponding only to the set of cookies with determined domain depths equivalent to the determined domain depth of the web page ensures that cookies with the same name but stored corresponding to different domains are not included. In some implementations, a path depth for each of the cookies may further be determined based on the at least one numerical value. A path depth for the web page is also determined. The identification of the set of cookies is further based on the determined path depths for each of the plurality of cookies and the determined path depth of the web page.

Figure 6A:
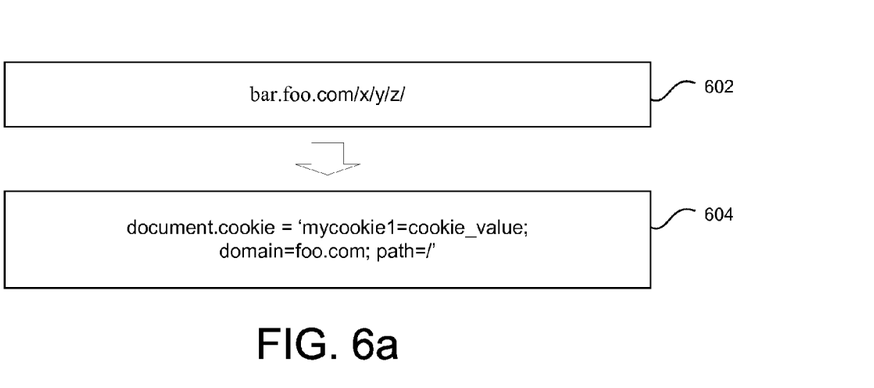
FIGS. 6a and 6b illustrate two example cookie values of a web page provided for storage.
Figure 6B:
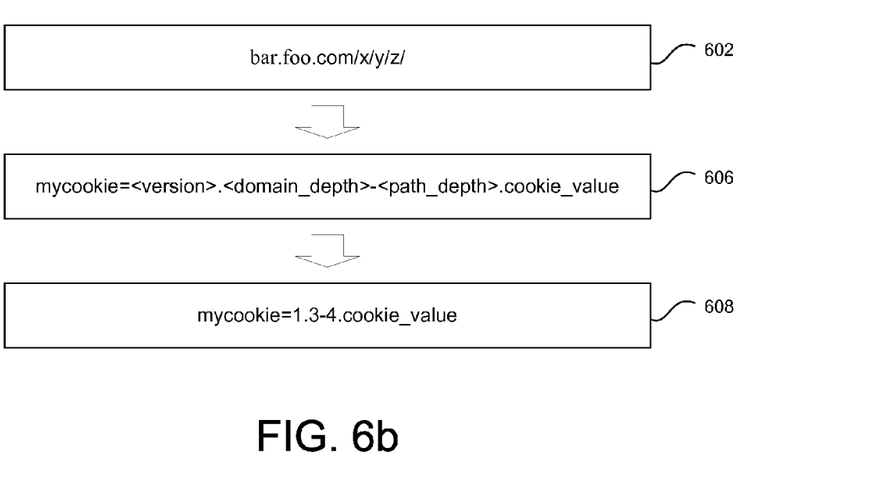

FIGS. 6a and 6b illustrate two example cookie values of a web page provided for storage. Web page, as shown in block 602, corresponds to a web page to which an application on a client device has navigated. In this example, a request for the generation of cookie data is made for "bar.foo.com/x/y/z". As shown in block 604, the cookie is stored as "document.cookie='mycookie1=cookie_value; domain=foo.com; path=/'". While the scope of the cookie (e.g., the domain and path) are included in the cookie values, the API does not return the domain and path when the cookies are read back out. Thus, when two cookies with the same name but different values have been stored corresponding to domains "foo.com" and "bar.foo.com", a web page on "bar.foo.com" reads the two cookies with the same name but different values with no way of distinguishing the corresponding domain to which the cookie was stored.

The values stored for a cookie depicted in FIG. 6b solves this issue by disambiguating the cookies with attached values corresponding to a domain depth and a path depth. The generated cookie data attaches additional information as shown in block 606 by the following format: "mycookie=<version>.<domain_depth>-<path_depth>.cookie_value". The resulting cookie value 608 is "mycookie=1.2-3.cookie_value". By incorporating a version number, a domain depth value, and a path depth value, a page on "bar.foo.com" reads the two cookies with the same name (i.e., cookie_value), and can differentiate the two by the prepended values. Since "bar.foo.com" has a domain depth of three, a page on "bar.foo.com" will read the cookie with the prepended value that corresponds to a domain depth of three.

Domain hashes also may be used to disambiguate cookies having the same name. Domain hashes may be a checksum (e.g., a 32-bit checksum) of the domain string. By adding the computed domain hashes to cookies, cookies with the same name but associated with different domain strings may be differentiated. However, the process of computing the original domain and path from a domain hash can be computationally intensive. For example, if the current page is bar.foo.com/x/y/z, the client software would need to compute the domain hash for all of the following in order to find one that has a particular domain hash:

bar.foo.com/x/y/z
bar.foo.com/x/y
bar.foo.com/x

-continued

```
bar.foo.com/
foo.com/x/y/z
foo.com/x/y
foo.com/x
foo.com/
com/x/y/z
com/x/y
com/x
com/
```

Disambiguating cookies by prepending values corresponding to domain and path depths to cookies, on the other hand, requires fewer computations since only a count of the number of components in the domain string is needed. The prepended values corresponding to the domain string are typically 3-5 characters in length, whereas domain hashes generally require 9 or more characters. Thus, the use the prepended values preserves more space for storing additional cookies. Furthermore, the use of domain hashes may not entirely disambiguate cookies since two different domain strings may compute to a same domain hash and produce a hash collision.

In situations in which the system discussed here collects information about a user, the user may be provided with an opportunity to control whether programs or features collect user information. For example, the user may be provided with control over whether or not cookies relating to user web browsing history are stored. In the event that the user permits cookies to be stored, the user may be further provided with control over when and where (e.g., which web pages) cookies may be used. Thus, the user may have control over whether information is collected about the user, and also how the collected information may be used.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 7:
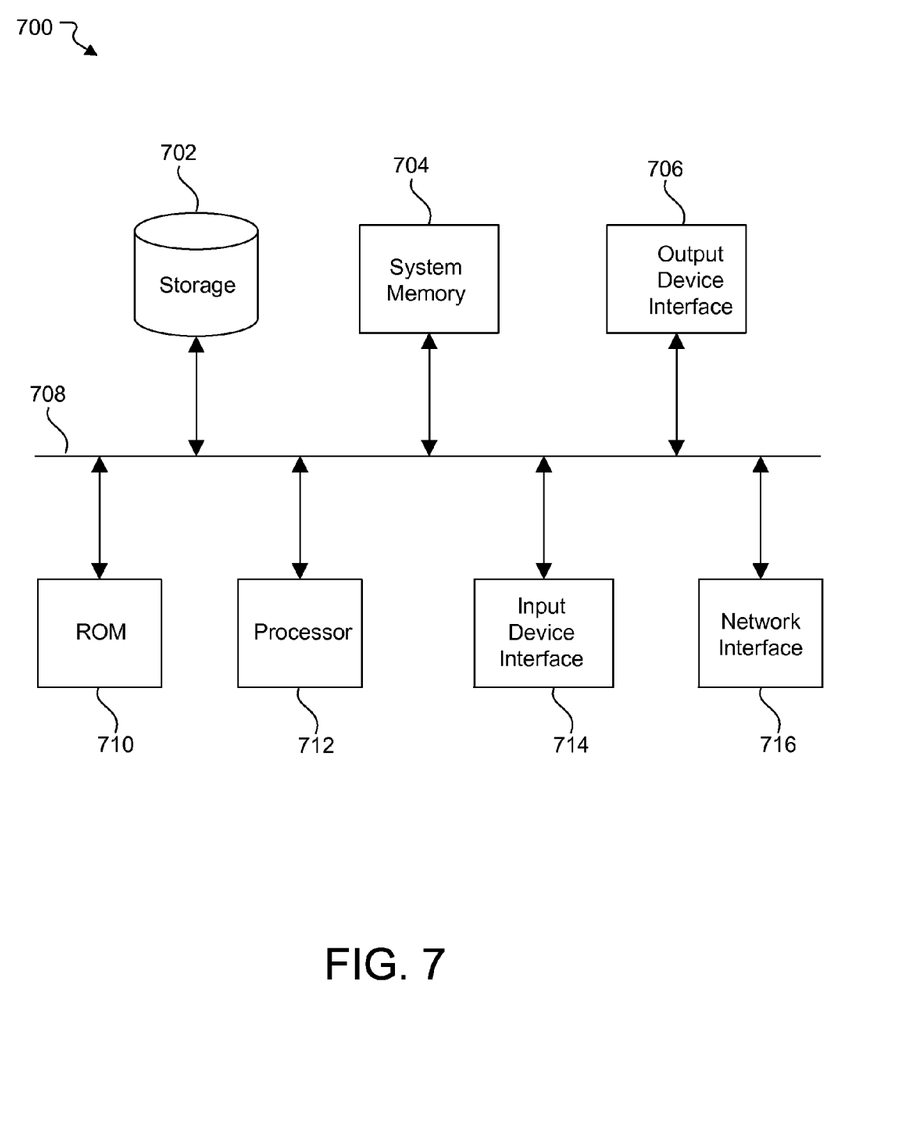
FIG. 7 conceptually illustrates an example electronic system with which some implementations of the subject technology are implemented.

FIG. 7 conceptually illustrates an example electronic system with which some implementations of the subject technology are implemented. Electronic system 700 can be a computer, phone, PDA, or any other sort of electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for incorporating additional information into the value of cookies in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interface 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that functions as both input and output devices.

Finally, as shown in FIG. 7, bus 708 also couples electronic system 700 to a network (not shown) through a network interface 716. In this manner, the computer can be a part of a network of computers, such as a local area network ("LAN"), a wide area network ("WAN"), or an Intranet, or a network of networks, such as the Internet. Any or all components of electronic system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for storing a cookie of a web page, the method comprising:
   receiving, by one or more processors, an initial cookie value associated with the cookie corresponding to a web page;
   identifying, by one or more processors, a domain depth of a uniform resource locator (URL) identifying the web page, the domain depth corresponding to a number of components in a domain name of the web page delimited by dots;
   identifying, by one or more processors, a path depth of the URL of the web page, the path depth corresponding to a number of path components delimited by one or more slashes;
   generating, by one or more processors, cookie data for the cookie comprising a name-value pair, wherein the name-value pair comprises the initial cookie value, the identified path depth and the identified domain depth, wherein generating the cookie data comprising the name-value pair comprises adding a value of the path depth to the name-value pair; and
   storing, by one or more processors, the generated cookie data on a database.

2. The computer-implemented method of claim 1, wherein identifying the domain depth of the uniform resource locator of the web page comprises:
   identifying a number of domain components delimited by one or more dots, wherein the domain depth corresponds to the number of domain components.

3. The computer-implemented method of claim 2, further comprising, prior to identifying the number of domain components, normalizing domain name by one of removing leading and trailing dots of the one or more dots that delimit domain components, or adding leading and trailing dots to the one or more domain components.

4. The computer-implemented method of claim 3, wherein identifying the path depth of the web page comprises:
   identifying a number of path components delimited by one or more slashes.

5. The computer-implemented method of claim 4, wherein identifying the number of path components comprises adding a root path to the path components delimited by one or more slashes.

6. The computer-implemented method of claim 4, further comprising, prior to identifying the number of path components, normalizing the web page by one of removing a trailing slash of one or more slashes that delimit path components, or adding a trailing slash to the path components.

7. The computer-implemented method of claim 1, wherein generating the cookie data further comprising adding value of the domain depth to the name-value pair.

8. The computer-implemented method of claim 7, wherein a first character separates the domain depth and the path depth in the name-value pair.

9. The computer-implemented method of claim 1, wherein the name-value pair further comprises a version number.

10. The computer-implemented method of claim 9, wherein the version number is used to identify a format in which the cookie data is stored.

11. A non-transitory machine-readable medium comprising instructions stored therein, which when executed by a system, cause the system to perform operations comprising:
    receiving a first plurality of cookies of a web page, wherein each cookie in the first plurality of cookies comprises a name-value pair, and wherein the name-value pair comprises an initial cookie value and at least one numerical value;
    determining a domain depth for each cookie in the first plurality of cookies based on the at least one numerical value;
    determining a domain depth of a uniform resource locator (URL) identifying the web page;
    identifying a second plurality of cookies based on the determined domain depths for each cookie in the first plurality of cookies and the determined domain depth of the web page; and
    providing a set of initial cookie values corresponding to the identified second plurality of cookies.

12. The machine-readable medium of claim 11, further comprising instructions for:
    determining a path depth for each cookie in the first plurality of cookies based on the at least one numerical value; and
    determining a path depth for the web page,
    wherein identifying the second plurality of cookies is further based on the determined path depths for each cookie in the first plurality of cookies and the determined path depth of the web page.

13. The machine-readable medium of claim 12, further comprising instructions for identifying a version number for each cookie in the first plurality of cookies based on the at least one numerical value, wherein the version number is used to identify a format in which the cookie is stored.

14. The machine-readable medium of claim 13, wherein a domain depth and a path depth are determined for each cookie in the first plurality of cookies based on the identified format corresponding to the version number.

15. The machine-readable medium of claim 12, wherein determining the path depth of the web page comprises:
    normalizing the web page by one of removing a trailing slash of one or more slashes that delimit path components, or adding a trailing slash to the path components; and identifying a number of path components delimited by one or more slashes.

16. The machine-readable medium of claim 15, wherein determining the number of path components comprises adding a root path to the path components delimited by one or more slashes.

17. The machine-readable medium of claim 12, wherein the second plurality of cookies includes cookies from the first plurality of cookies whose determined path depths match the determined path depth of the web page.

18. The machine-readable medium of claim 11, wherein determining the domain depth of the web page comprises:
   normalizing the web page by one of removing leading and trailing dots of the one or more dots that delimit domain components or adding leading and trailing dots to the one or more domain components; and
   identifying a number of domain components delimited by one or more dots.

19. The machine-readable medium of claim 11, wherein the second plurality of cookies includes cookies from the first plurality of cookies whose determined domain depths match the determined domain depth of the web page.

20. A system for storing a cookie corresponding to a domain of a web page, the system comprising:
   one or more processors; and
   a machine-readable medium comprising instructions stored therein, which when executed by the processors, cause the processors to perform operations comprising:
   receiving an initial cookie value associated with a cookie corresponding to a web page;
   identifying a domain depth of a uniform resource locator (URL) identifying the web page, wherein the domain depth corresponds to a number of components in a domain name of the web page delimited by one or more dots;
   identifying a path depth of the URL of the web page, wherein the path depth corresponds to a number of path components delimited by one or more slashes;
   generating cookie data comprising a name-value pair, wherein the name-value pair comprises the initial cookie value, the identified domain depth, and the identified path depth, and wherein generating the cookie data comprising the name-value pair comprises prepending the path depth to the received initial cookie value, and prepending the domain depth to the path depth, wherein the prepended domain depth and the prepended path depth are separated by a first symbol; and
   storing the generated cookie data corresponding to a domain of the web page.

21. The system of claim 20, wherein the prepended domain depth and the prepended path depth are separated from the initial cookie value by a second symbol, wherein the second symbol is different from the first symbol.

22. The system of claim 20, wherein the name-value pair further comprises a version number prepended to the domain depth, and wherein the version number is used to identify a format in which the cookie data is stored.

* * * * *